US012779604B2

(12) United States Patent
Nagase et al.

(10) Patent No.: US 12,779,604 B2
(45) Date of Patent: Nov. 3, 2026

(54) PALLET LIFTING DEVICE AND PALLET CONVEYING DEVICE PROVIDED WITH PALLET LIFTING DEVICE

(71) Applicant: NITTOKU Co., Ltd., Saitama-city (JP)

(72) Inventors: Shigenobu Nagase, Fukushima (JP); Shota Komiya, Fukushima (JP)

(73) Assignee: NITTOKU Co., Ltd., Saitama-city (JP)

( * ) Notice: Subject to any disclaimer, the term of this patent is extended or adjusted under 35 U.S.C. 154(b) by 45 days.

(21) Appl. No.: 18/996,635

(22) PCT Filed: Nov. 10, 2023

(86) PCT No.: PCT/JP2023/040618
§ 371 (c)(1),
(2) Date: Jan. 17, 2025

(87) PCT Pub. No.: WO2024/106346
PCT Pub. Date: May 23, 2024

(65) Prior Publication Data

US 2026/0034626 A1 Feb. 5, 2026

(30) Foreign Application Priority Data

Nov. 14, 2022 (JP) ................................ 2022-181586

(51) Int. Cl.
*B65G 47/90* (2006.01)
*B23Q 7/00* (2006.01)
*B23Q 7/14* (2006.01)

(52) U.S. Cl.
CPC ........... *B23Q 7/005* (2013.01); *B23Q 7/1421* (2013.01)

(58) Field of Classification Search
CPC .......... B65G 47/90; B23Q 7/005; B23Q 7/14; B23Q 7/1421
USPC ........................................... 198/345.3, 346.2
See application file for complete search history.

(56) References Cited

U.S. PATENT DOCUMENTS 5,398,484 A * 3/1995 Kader .................. B65B 43/465 198/463.3
6,758,320 B1 * 7/2004 Tegel .................. B23Q 7/1426 198/465.1
8,430,229 B2 * 4/2013 Abbestam ............ B23Q 7/1447 198/463.3
8,978,218 B2 * 3/2015 Moder .................. B23Q 7/048 29/33 P
9,443,717 B2 * 9/2016 Takano ................. B23P 21/004
10,494,188 B2 * 12/2019 Zembutsu ............. B65G 47/52
(Continued)

FOREIGN PATENT DOCUMENTS

JP 5498943 B2 5/2014

*Primary Examiner* — Douglas A Hess
(74) *Attorney, Agent, or Firm* — Rabin & Berdo, P.C

(57) ABSTRACT

A pallet lifting device configured to lift a pallet mounted on and conveyed by a moving belt while the pallet is being conveyed, the pallet lifting device including: lifting and lowering actuators provided on both sides of the belt such that the belt is provided between the lifting and lowering actuators; a mounting member provided so as to be movable up and down by the lifting and lowering actuators, the mounting member being configured so as to be able to mount the pallet at a lowered position; and a fixing unit configured to clamp the pallet with the mounting member in a state in which the mounting member mounting the pallet is moved upward.

7 Claims, 9 Drawing Sheets

(56) References Cited

U.S. PATENT DOCUMENTS

| | | | | |
|---|---|---|---|---|
| 10,981,733 | B2 * | 4/2021 | Ichikawa | B07C 5/36 |
| 2010/0252399 | A1 | 10/2010 | Abbestam | |

* cited by examiner

PALLET LIFTING DEVICE AND PALLET CONVEYING DEVICE PROVIDED WITH PALLET LIFTING DEVICE

TECHNICAL FIELD

The present invention relates to a pallet lifting device and a pallet conveying device provided with the pallet lifting device.

BACKGROUND ART

Conventionally, in production lines, a pallet conveying device including a free flow conveyor is provided so as to link a plurality of machine tools, pallets each mounting a workpiece are mounted on and conveyed by the free flow conveyor, and a predetermined processing is performed on the workpiece mounted on the pallet by the machine tool at the conveying destination.

With such a pallet conveying device, when there is a pallet mounting the workpiece that is in-process or unprocessed in front of a pallet mounting workpiece that has been processed, the pallet mounting the workpiece that has been processed cannot be conveyed until the processing of the other workpiece is finished, and this frequently results in a phenomenon of pallet congestion.

In order to solve such a phenomenon, there has been proposed a lifting device that is mounted on a conveyor and lifts the pallet while it is being conveyed, thereby allowing other pallets to pass underneath (for example, see JP5498943B).

With this lifting device, the pallet congestion is solved by gripping both sides of the pallet being conveyed and lifting the pallet in this state to allow other pallets to pass underneath.

SUMMARY OF INVENTION

However, in the above-described pallet lifting device, a lifting head corrects misalignment of the pallet and grabs the pallet at the same time as it starts to move upwards, and so, there is not enough time to ensure the correction of the misalignment. Therefore, when the workpiece is mounted on the pallet, compared with a case in which the misalignment is corrected over a longer period of time, an impact applied to the workpiece becomes stronger, and there is a risk in that the workpiece is misaligned from a predetermined position on the pallet or that the workpiece falls off from the pallet.

An object of the present invention is to provide a pallet lifting device capable of correcting misalignment of a pallet while lifting up the pallet.

According to an aspect of the present invention, a pallet lifting device configured to lift a pallet mounted on and conveyed by a moving belt while the pallet is being conveyed, the pallet lifting device including: lifting and lowering actuators provided on both sides of the belt such that the belt is provided between the lifting and lowering actuators; a mounting member provided so as to be movable up and down by the lifting and lowering actuators, the mounting member being configured so as to be able to mount, at a lowered position, the pallet, which is mounted on and conveyed by the belt; and a fixing mechanism configured to fix the pallet to the mounting member by clamping the pallet with the mounting member in a state in which the mounting member mounting the pallet is moved upward by the lifting and lowering actuators.

DESCRIPTION OF EMBODIMENTS

Figure 1:
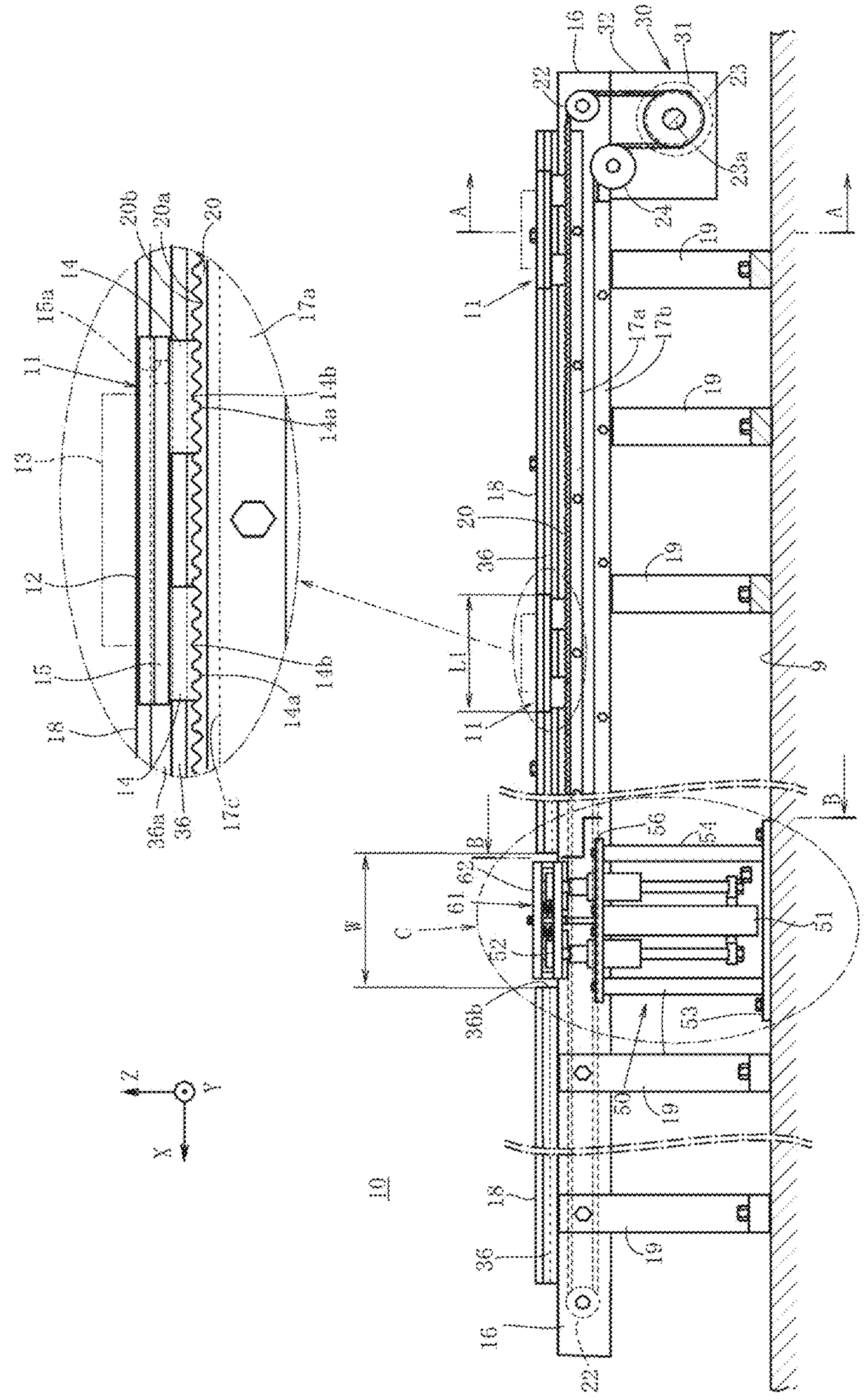
FIG. 1 is a front view of a pallet conveying device provided with a pallet lifting device of an embodiment of the present invention.

The best mode for carrying out the present invention will be described with reference to the drawings.

A pallet lifting device 50 according to this embodiment lifts a pallet 11 that is being mounted on and conveyed by moving belts 20 while the pallet 11 is being conveyed.

The pallet lifting device 50 will be described for a case in which the pallet lifting device 50 is provided on a pallet conveying device 10, in which the pallets 11 are mounted on the belts 20 and the belts 20 are circulated to convey the pallets 11, as an example.

Figure 2:
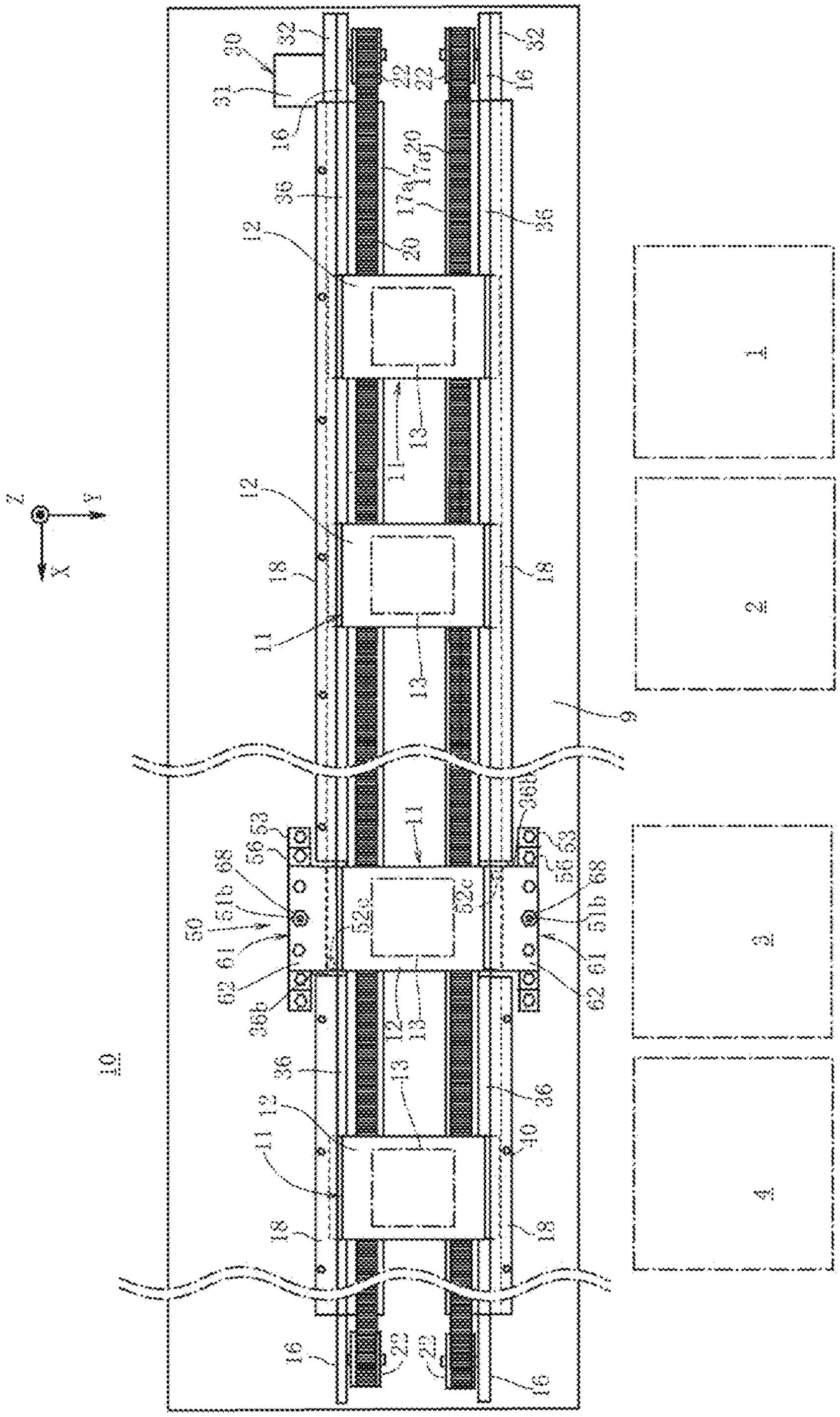
FIG. 2 is a top view of the pallet conveying device provided with the pallet lifting device.

FIGS. 1 and 2 each shows the pallet conveying device 10 provided with the pallet lifting device 50. In each of FIGS. 1 to 9, three axes, X, Y, and Z, that mutually orthogonal are set, and the X axis extends in the substantially horizontal transverse direction, the Y axis extends in the substantially horizontal front-rear direction, and the Z axis extends in the vertical direction.

As shown in FIGS. 1 and 2, the pallet conveying device 10 is provided with a pair of belts 20 that are formed so as to be capable of being circulated and on which the pallets 11 are mounted, and a driving mechanism 30 that circulate the belts 20 to convey the pallets 11 mounted on the belts 20. A conveying path for conveying the pallets 11 is formed by the belts 20.

In the pallet conveying device 10, the pallets 11, on each of which the workpiece (not shown) is mounted, are mounted on and conveyed by the belts 20. The pallet conveying device 10 is used for a case in which the circulation of the belts 20 are stopped to stop the conveyance of the pallets 11 in front of machine tools 1 to 4 (see FIG. 2) that are provided along the conveying path of the pallet conveying device 10, and the workpiece (not shown) mounted on each of the pallets 11 is subjected to the processing by each of the machine tools 1 to 4.

In FIG. 2, although a case in which four machine tools 1 to 4 are provided on one side of the pallet conveying device 10, the number of the machine tools 1 to 4 varies depending on the workpiece requiring the processing. Therefore, the number of the machine tools 1 to 4 is increased or decreased in accordance with the number of the pallets 11, etc. appropriately.

As shown in FIGS. 1 and 2, the pallet conveying device 10 is provided with: a platform 9 provided along a plurality of machine tools 1 to 4; a pair of plates 16 that are provided in parallel with each other on the platform 9 so as to extend along the conveying path of the pallets 11 (in the X axis direction) and so as to be spaced at a predetermined interval in the width direction (in the Y axis direction); and a plurality of support legs 19 that are erected on the platform 9 so as to be spaced at predetermined intervals in the conveying path (in the X axis direction). The pair of plates 16 are fixed to the support legs 19 above the platform 9.

As shown in FIG. 2, in the pallet conveying device 10, the pair of belts 20 are respectively supported by the pair of plates 16. The pair of belts 20 respectively support both of end portions of the pallets 11 in the width direction (in the Y axis direction). In other words, the pallets 11 are mounted across the pair of belts 20.

Because the pair of belts 20 have the same shape, only one of the belts 20 will be described below. As shown in FIG. 1, pulleys 22 between which the belt 20 is suspended are respectively provided on both end portions of the plate 16.

The belt 20 is suspended between the pair of pulleys 22 provided on both ends of the plate 16 such that its carrier portion extend horizontally.

Figure 3:
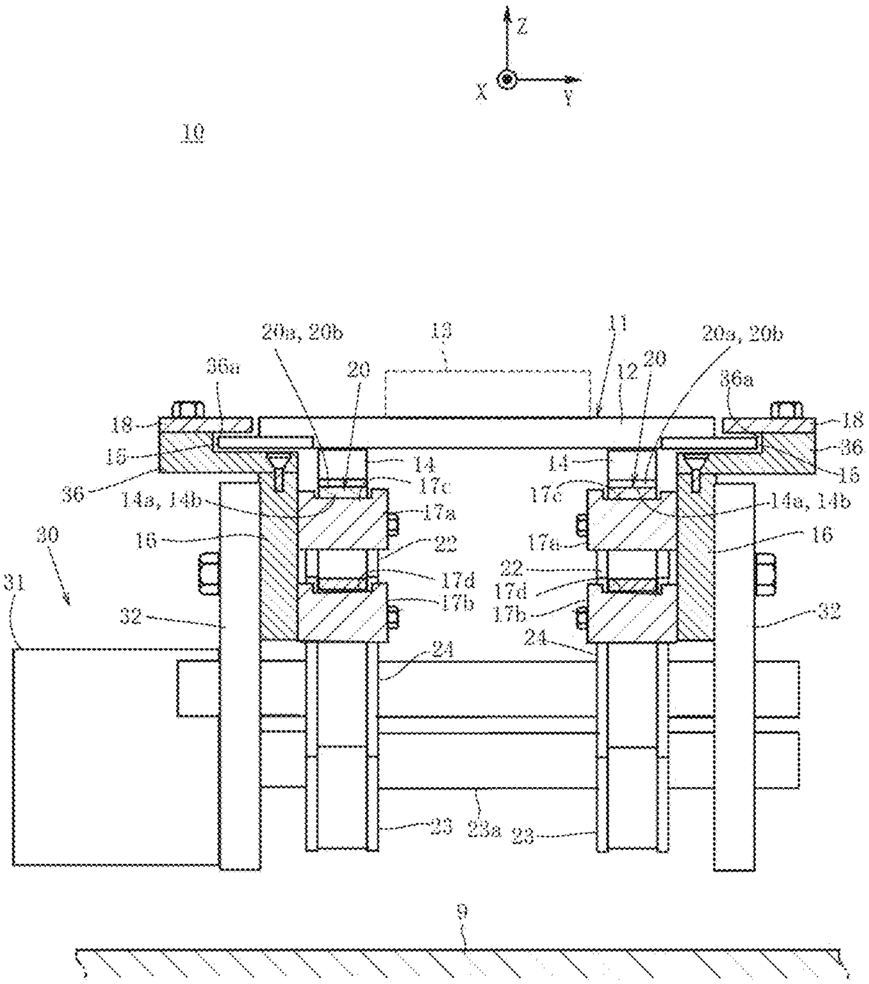
FIG. 3 is a sectional view taken along line A-A in FIG. 1.

In addition, as shown in FIG. 3, the pair of plates 16 and 16 are each provided with an upper support member 17*a* that supports the carrier portion of the belt 20 suspended between the pulleys 22 to prevent slack of the carrier portion and a lower support member 17*b* that supports a return portion of the belt 20 suspended between the pulleys 22 to prevent slack of the return portion.

The upper support member 17*a* and the lower support member 17*b* are attached to the plate 16 by screwing. The upper support member 17*a* and the lower support member 17*b* are respectively formed with grooves 17*c* and 17*d* that receives the belt 20 and prevent movement of the belt 20 in the width direction (in the Y axis direction).

As shown in FIGS. 1 and 3, in the pallet conveying device 10, the driving mechanism 30 that circulates the belts 20 is provided with driving pulleys 23 around which the belts 20 are respectively suspended and a motor 31 that rotates the driving pulleys 23.

Specifically, as shown in FIG. 3, support plates 32 are respectively attached to end portions of the pair of plates 16, and a driving shaft 23*a* is installed so as to be rotatably supported by the support plates 32. In a region of the driving shaft 23*a* between the pair of plates 16, a pair of driving pulleys 23 having the same shape and the same size are attached.

The driving pulleys 23 are provided on the same plane as the pulleys 22. As shown in FIG. 1, the belt 20 that is directed by the pulley 22 is suspended around the driving pulley 23. In addition, on each of the support plates 32, a directing pulley 24 that guides the belt 20, which is suspended around the driving pulley 23, to the lower support member 17*b* is rotatably supported.

As shown in FIG. 3, the motor 31 is attached to one of the support plates 32 and is driven by a command from a controller (not shown) to rotate the driving shaft 23*a*. The motor 31 drives the driving shaft 23*a* to rotate the pair of driving pulleys 23 attached to the driving shaft 23*a* at the same time in the same direction, thereby allowing the pair of belts 20 to be circulated in the same direction.

In this embodiment, a so-called toothed belt is used as the belt 20. Specifically, as shown in an enlarged view in FIG. 1, in FIG. 2, and so forth, the belt 20 is formed with, on an outer surface of the belt 20 serving as a mounting surface for the pallet 11, grooves and teeth 20*a* and 20*b* serving as a first engagement part extending in the width direction (in the Y axis direction). The grooves and teeth 20*a* and 20*b* are formed alternately and sequentially in the longitudinal direction (in the X axis direction).

As shown in FIGS. 2 and 3, the pallet 11 has: a base mount 12 that has a rectangular shape when viewed in a top view and that is supported by the belts 20 at both sides; flange members 15 that are provided horizontally on both sides of lower parts of the base mount 12 in the width direction (in the Y axis direction) so as to project out from the side edges thereof; a mounting tool 13 that is provided on an upper surface of the base mount 12 and that mounts the workpiece (not shown) that is to be processed by the machine tools 1 to 4; and contact members 14 that are provided on a lower surface of the base mount 12 and that respectively come into direct contact with the belts 20.

The mounting tool 13 may have a different shape depending on the type of the workpiece to be conveyed. In addition, a plurality of pallets 11, each of which is provided with the mounting tool 13, are prepared in order to continuously convey a plurality of workpieces.

As shown in the enlarged view in FIG. 1, the contact members 14 provided on the base mount 12 of the pallet 11 are each formed with grooves and teeth 14*a* and 14*b* serving as a second engagement part that is capable of engaging with the grooves and teeth 20*a* and 20*b* of the belts 20. In order to be able to engage with the grooves and teeth 20*a* and 20*b* of the belts 20, grooves and teeth 14*a* and 14*b* of the contact members 14 are formed to have the same shape and the same size as the grooves and teeth 20*a* and 20*b* in cross-section.

When the pallet 11 is mounted on the belts 20 and the contact members 14 are brought to overlap with the belts 20, the grooves and teeth 14*a* and 14*b* formed on the contact members 14 engage with the grooves and teeth 20*a* and 20*b* formed on the belts 20. As a result, the movement of the pallet 11 in the X axis direction independent of the belts 20 (relative movement with respect to the pallet 11) is prohibited. In other words, the pallet 11 and the belts 20 move together.

As shown in FIG. 3, in a state in which both sides of the pallet 11 in the width direction are supported by the belts 20 via the contact members 14, the flange members 15 provided on both sides of the base mount 12 respectively pass over the plates 16 and project outwards to the outer sides of the plates 16. A pair of guide members 36 are respectively attached to upper edges of the plates 16 so as to sandwich the pallet 11 including the flange members 15 from the outside in the width direction (in the Y axis direction) with a predetermined gap therebetween.

The guide members 36 are each formed so as to project further outward in the width direction (in the Y axis direction) than the flange member 15 and is attached to the upper edge of the plate 16. The guide member 36 is formed with a step portion 36*a* that opposes to an outer edge of the flange member 15 in the width direction. As the step portion 36*a* opposes to the outer edge of the flange member 15 with a small gap, it is possible to prevent the misalignment of the pallet 11 in the width direction without inhibiting the movement of the pallet 11 including the flange members 15 in the conveying direction.

In addition, a retaining member 18 is attached to an upper surface of a portion of the guide member 36 projecting upward. The retaining member 18 is formed of, for example, a flat plate that extends to a position opposing to an upper surface of the flange member 15 of the pallet 11. A predetermined gap is formed between the retaining member 18 and the flange member 15 in the vertical direction (in the Z axis direction) and between the flange member 15 and the guide member 36. In addition, the retaining member 18 is provided so as to oppose to a side surface of the base mount 12 in the Y axis direction such that a predetermined gap is formed therebetween. With such a configuration, it is possible to prevent the movement of the base mount 12 in the width direction (in the Y axis direction).

In addition, by providing the retaining member 18, it is possible to prevent the pallet 11 mounted on the belts 20 from lifting off from the belts 20 or from tilting relative to the belts 20. As a result, it is possible to maintain a state in which the grooves and teeth 14*a* and 14*b* formed on the contact members 14 of the pallet 11 are engaged with the grooves and teeth 20*a* and 20*b* formed on the belts 20, and so, it is possible to prohibit relative movement between the belt 20 and the pallet 11. In other words, it is possible to covey the pallets 11 by the belts 20 reliably.

In the pallet conveying device 10, when the motor 31 is driven and the belts 20 on which the pallet 11 is mounted is circulated, the pallet 11 is moved while in a state in which the pallet 11 is mounted on the belts 20 and is conveyed by a distance equal to the moved amount of the belts 20.

As shown in FIGS. 1, and 4 to 9, the pallet conveying device 10 is further provided with the pallet lifting device 50 that lifts the pallet 11 mounted on and conveyed by the belts 20 while the pallet 11 is being conveyed.

Figure 4:
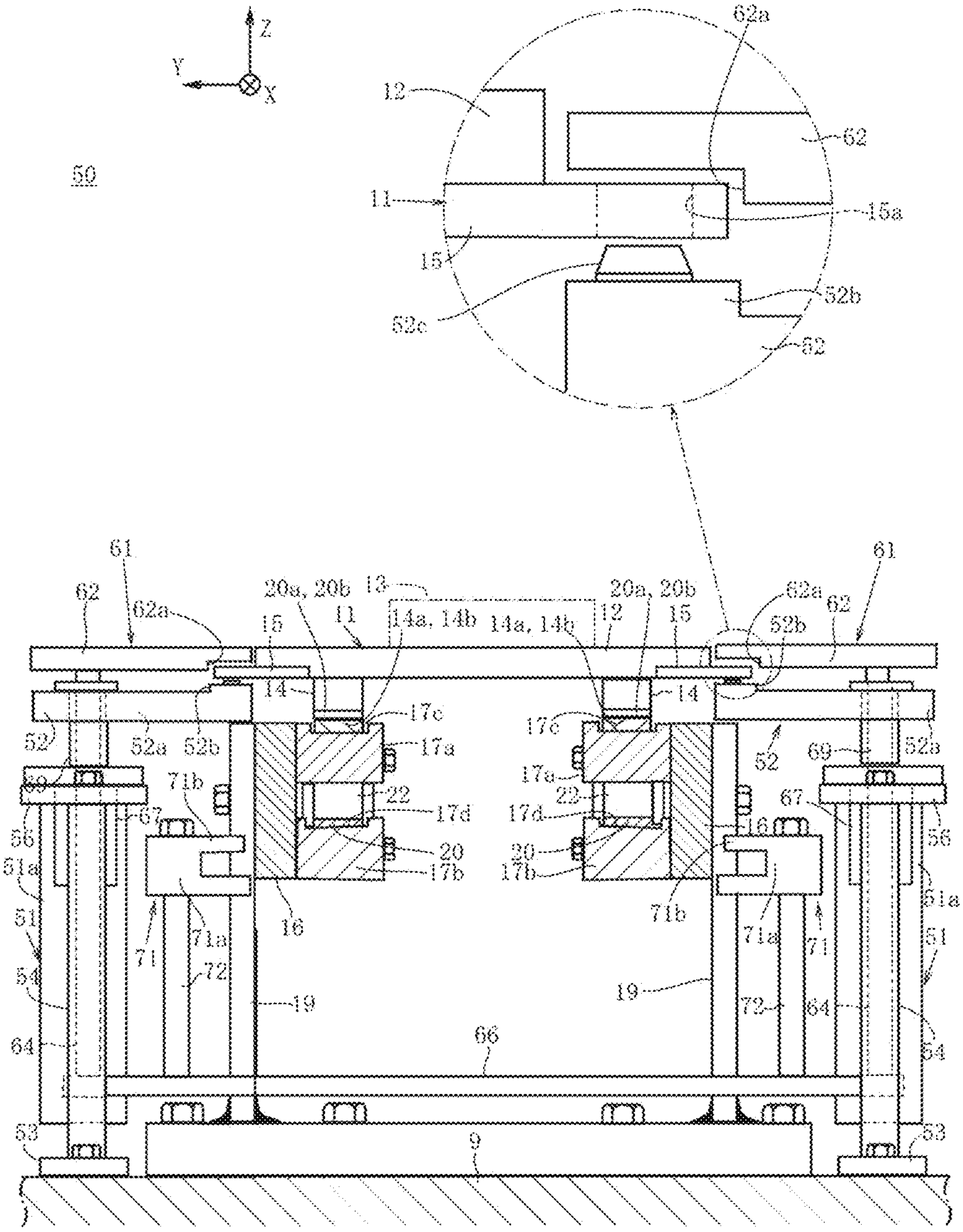
FIG. 4 is a sectional view taken along line B-B in FIG. 1.

As shown in FIG. 4, etc., the pallet lifting device 50 is provided with a pair of lifting and lowering actuators 51 that are provided such that the pair of plates 16 are placed therebetween in the Y axis direction (outside the pair of plates 16) and mounting members 52 that are provided so as to be movable up and down by the lifting and lowering actuators 51 and that are configured to be able to mount the pallet 11, which is to be mounted on and conveyed by the belts 20, at a lowered position.

Figure 5:
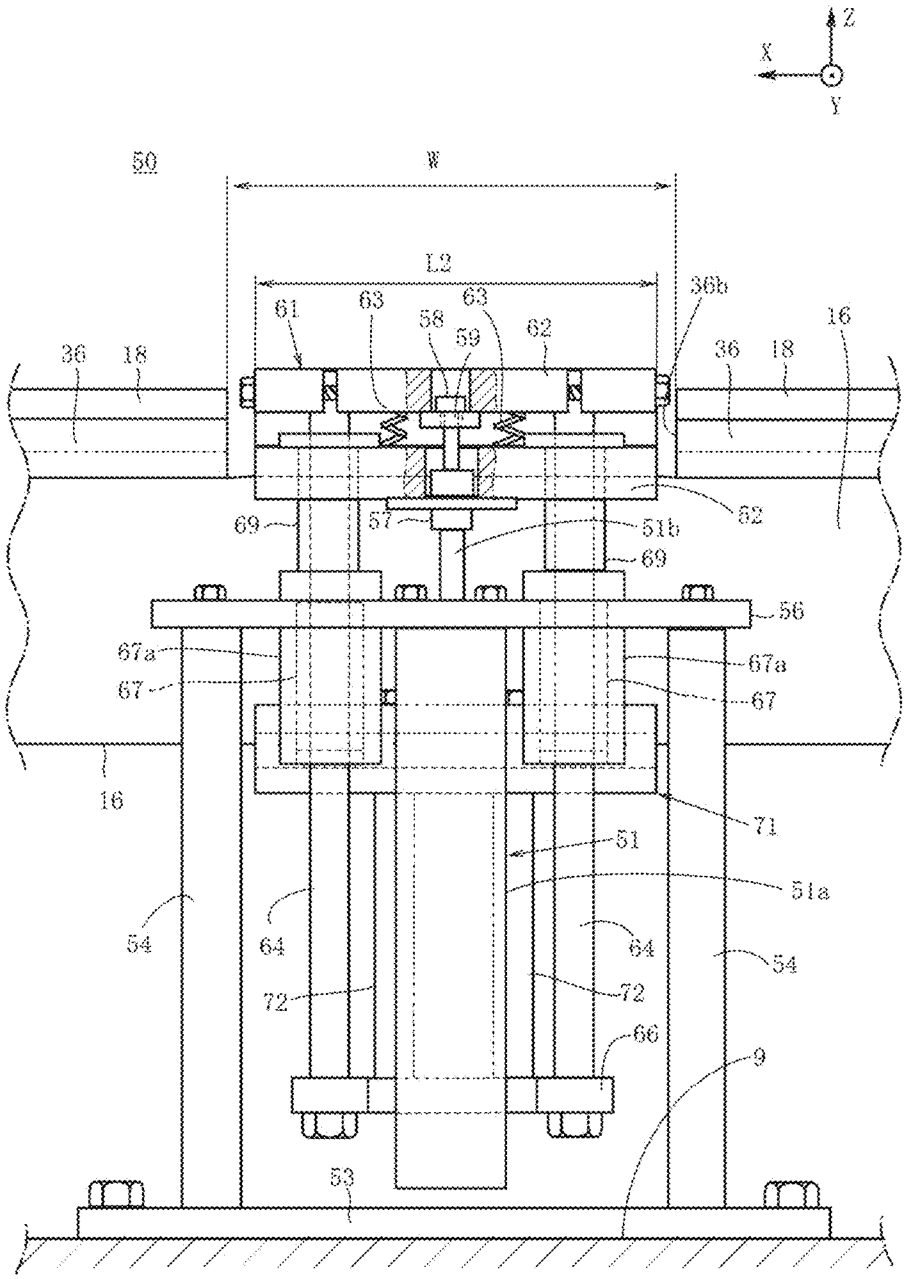
FIG. 5 is an enlarged view of a portion C in FIG. 1 showing the pallet lifting device.

As shown in FIGS. 4 and 5, on the platform 9, base plates 53 configuring the pallet lifting devices 50 are respectively installed for a pair of the lifting and lowering actuators 51. The base plates 53 are respectively provided with a pair of support columns 54 and 54 (see FIG. 5) that are erected so as to be spaced apart from each other in the conveying direction (in the X axis direction), and attachment plates 56 are respectively installed on upper ends of the pair of support columns 54 and 54.

The lifting and lowering actuators 51 in this embodiment are each configured of a fluid pressure cylinder, for example. Each of the lifting and lowering actuators 51 is arranged in the vertical direction (in the Z axis direction) such that a rod 51*b* penetrates through the attachment plate 56 from below, and an upper surface of a main body portion 51*a* is attached to a lower surface of the attachment plate 56.

As shown in FIG. 5, the mounting member 52 is attached to the tip end side of the rod 51*b* of the lifting and lowering actuator 51. The guide member 36 is formed with a cutout portion 36*b* into which the mounting member 52 and a fixing mechanism 61, which will be described later, can enter.

As shown in FIG. 4, the mounting member 52 has an attachment portion 52*a* to which the rod 51*b* (see FIG. 5) is attached and a mounting portion 52*b* that is formed so as to project upwards at an end edge of the attachment portion 52*a* on the plate 16 side and on which the pallet 11 is mounted.

The length W of the cutout portion 36*b* of the guide member 36 (see FIGS. 1 and 5) is formed so as to be longer than the length L1 of the pallet 11 in the conveying direction (see FIG. 1). In addition, as shown in FIG. 5, the length L2 of the mounting member 52 is set so as to be equivalent to the length L1 of the pallet 11 in the conveying direction (see FIG. 1). With such a configuration, it is possible to allow the pallet 11 and the mounting member 52 to enter the cutout portion 36*b* of the guide member 36, and at the same time, it is possible to minimize a gap formed between the pallet 11 and the guide member 36 and a gap formed between the mounting member 52 and the guide member 36.

As shown in FIGS. 4 and 5, in a state in which the rod 51*b* is retracted into the main body portion 51*a*, the mounting member 52 is in a lowered state. In this state, the flange member 15 of the pallet 11 mounted on the belts 20 passes above the mounting portion 52*b* of the mounting member 52. In other words, in a state in which the mounting member 52 is lowered, the pallet 11 mounted on the belts 20 can pass through the pallet lifting device 50 without coming into contact with the mounting member 52 and a pressing plate 62.

Figure 6:
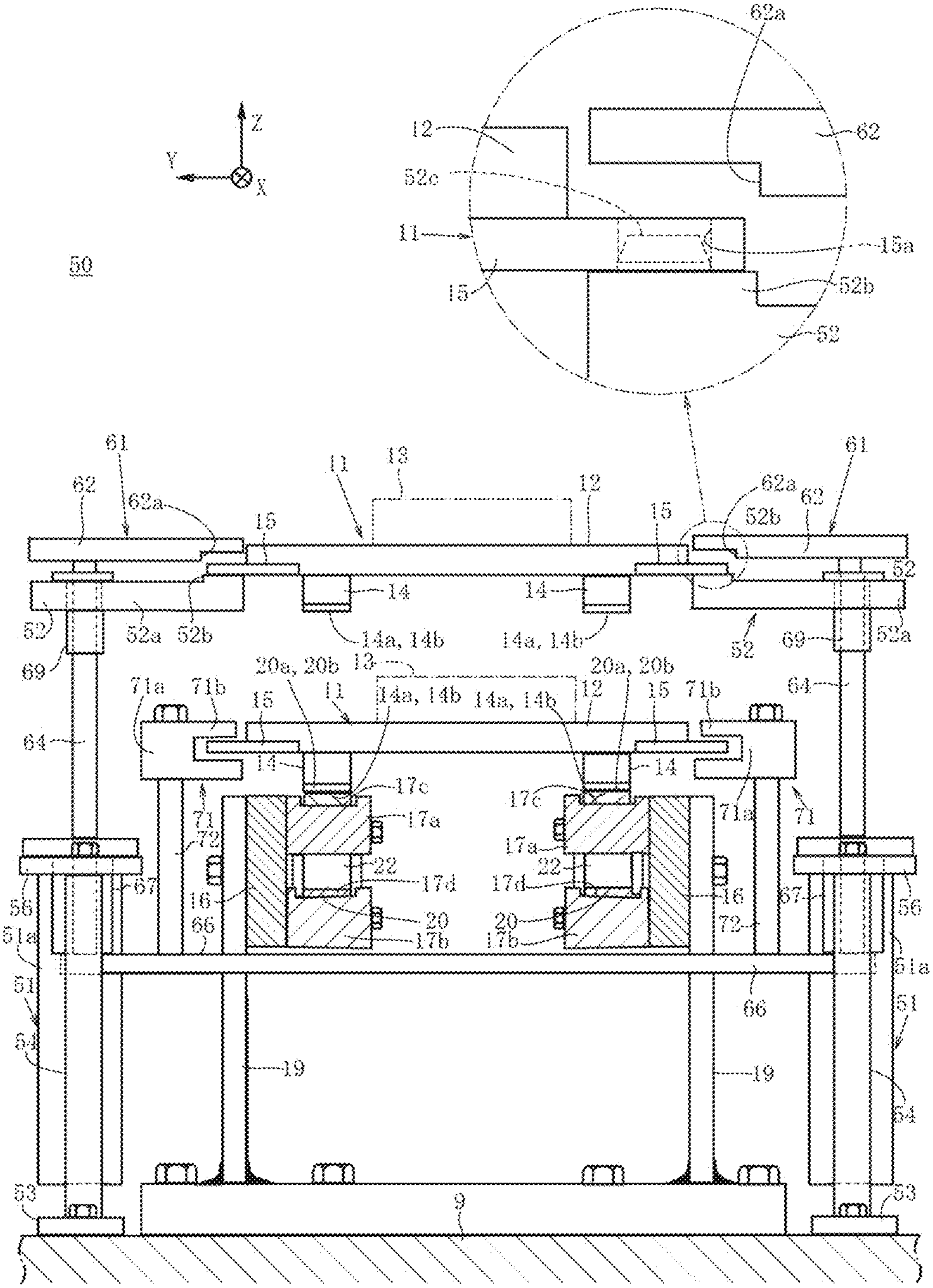
FIG. 6 is a diagram showing a state in which a pallet is lifted by the pallet lifting device, and is a diagram corresponding to FIG. 4.
Figure 7:
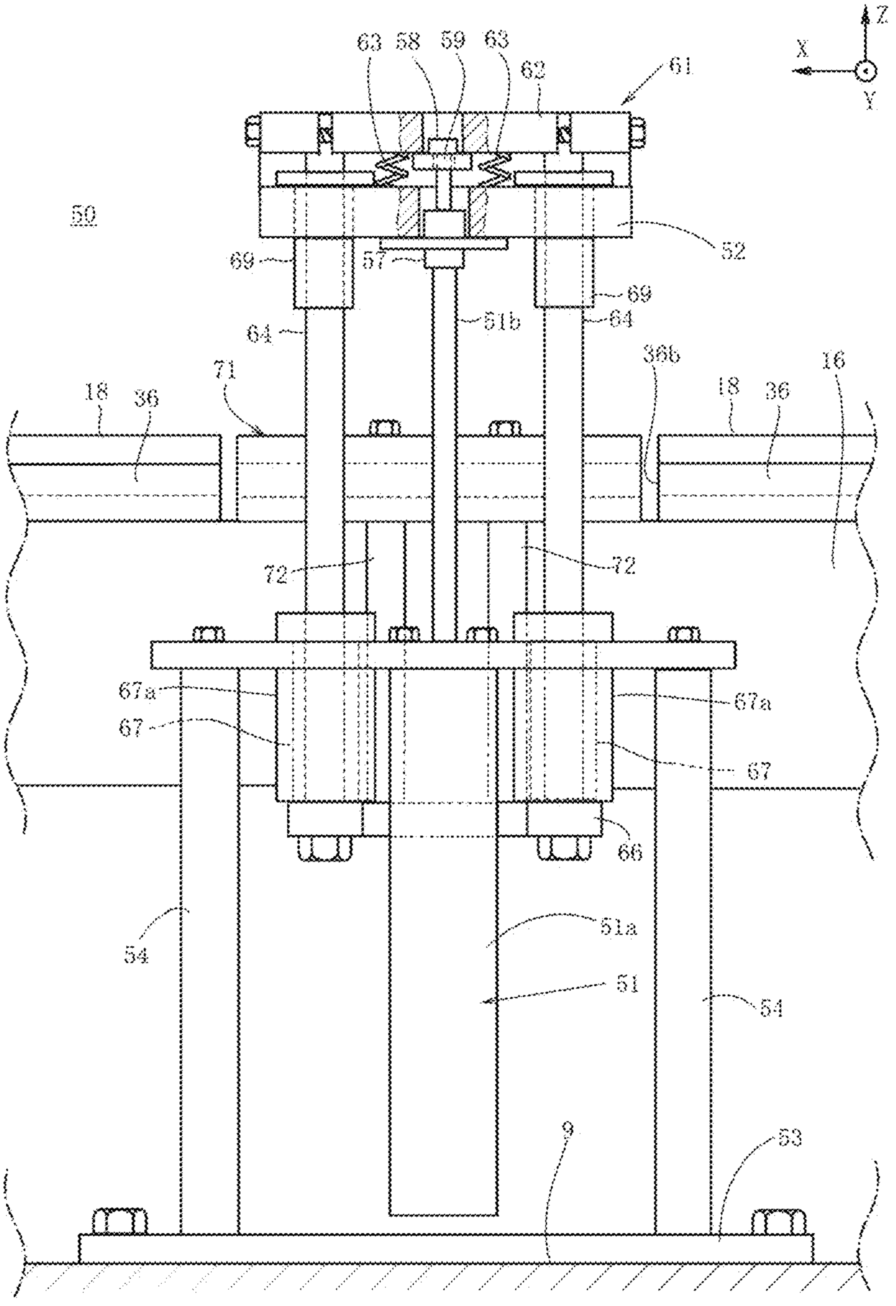
FIG. 7 is a diagram showing a state in which the pallet is lifted by the pallet lifting device, and is a diagram corresponding to FIG. 5.

As shown in FIG. 7, as the rod 51*b* is extended to project out from the main body portion 51*a* in a state in which the pallet 11 opposes to the pallet lifting device 50, in other words, in a state in which the flange member 15 of the pallet 11 is positioned above the mounting portion 52*b* of the mounting member 52, the lifting and lowering actuator 51 causes the pallet 11 to be mounted on the mounting portion 52*b* of the mounting member 52 as shown in FIG. 6. As a result, the pallet 11 mounted on the mounting portion 52*b* of the mounting member 52 is moved away from the cutout portion 36*b* (see FIG. 7).

The pallet lifting device 50 is provided with the fixing mechanism 61 that fixes the pallet 11 to the mounting member 52 when the mounting member 52 on which the pallet 11 is mounted is lifted up to a predetermined position by the lifting and lowering actuator 51.

As shown in FIGS. 4 and 5, the fixing mechanism 61 in this embodiment is provided on each of both sides of the lifting and lowering actuators 51 in the conveying direction. The fixing mechanism 61 is provided with: up and down rods 64 that are movable up and down with respect to the mounting member 52; the pressing plate 62 that is attached at upper ends of the up and down rods 64 and above the mounting member 52 so as to be spaced from the mounting member 52 at a predetermined gap; springs 63 that serve as biasing members for applying a biasing force such that the gap between the pressing plate 62 and the mounting member 52 is increased (see FIG. 5); a slide plate 66 that is attached to lower ends of the up and down rods 64; and collars 67*a* each serving as a limiting member that prohibits further upward movement of the up and down rods 64 when the mounting member 52 mounting the pallet 11 is lifted up to a predetermined position by the lifting and lowering actuator 51.

As shown in FIG. 5, linear bushings 67 that guide the up and down rods 64 are attached to the attachment plate 56. Linear bushings 69 are also attached to the attachment portion 52*a* of the mounting member 52 so as to be coaxial with the linear bushings 67. In addition, the collars 67*a* that respectively accommodate the linear bushings 67 to the inside thereof and that each serves as the limiting member are attached to the attachment plate 56. The collars 67*a* also have a function of protecting the linear bushings 67. The length of the collars 67*a* in the Z axis direction is set so as to be longer than that of the linear bushings 67.

The up and down rods 64 are respectively inserted into the linear bushings 67 and the linear bushings 69 so as to be movable in the axial direction. The pressing plate 62 is installed on upper ends of a pair of up and down rods 64.

The springs 63 are each, for example, a coil spring interposed between the mounting member 52 and the pressing plate 62. A floating joint 57 is provided on a tip end of the rod 51*b* of the lifting and lowering actuator 51. In addition, the floating joint 57 is attached to the mounting member 52. In other words, the mounting member 52 is attached to the tip end of the rod 51*b* via the floating joint 57.

A stripper bolt 58 is provided on the floating joint 57 coaxially with the rod 51*b* so as to penetrate through the mounting member 52. In addition, the stripper bolt 58 is provided so as to extend the rod 51*b* and penetrates through a stopper 59 attached to the pressing plate 62. By a head portion of the stripper bolt 58 abutting against the stopper 59, the gap between the mounting member 52 and the pressing plate 62 is prevented from being increased to a predetermined value or more by the biasing force applied by the springs 63 (see FIG. 5).

As shown in FIG. 7, the slide plate 66 is attached across lower parts of the pair of up and down rods 64. As the pair of up and down rods 64 are moved upward, and the slide plate 66 abuts the collars 67*a* each serving as the limiting member, further upward movement of the pair of up and down rods 64 is restricted.

Therefore, in the fixing mechanism 61 having such a configuration, when the pallet 11 is mounted on the mounting member 52 of the pallet lifting device 50 and lifted, and the collars 67*a* come to abut against the slide plate 66, further upward movement of the pressing plate 62 provided on the pair of up and down rods 64 is restricted.

Figure 8:
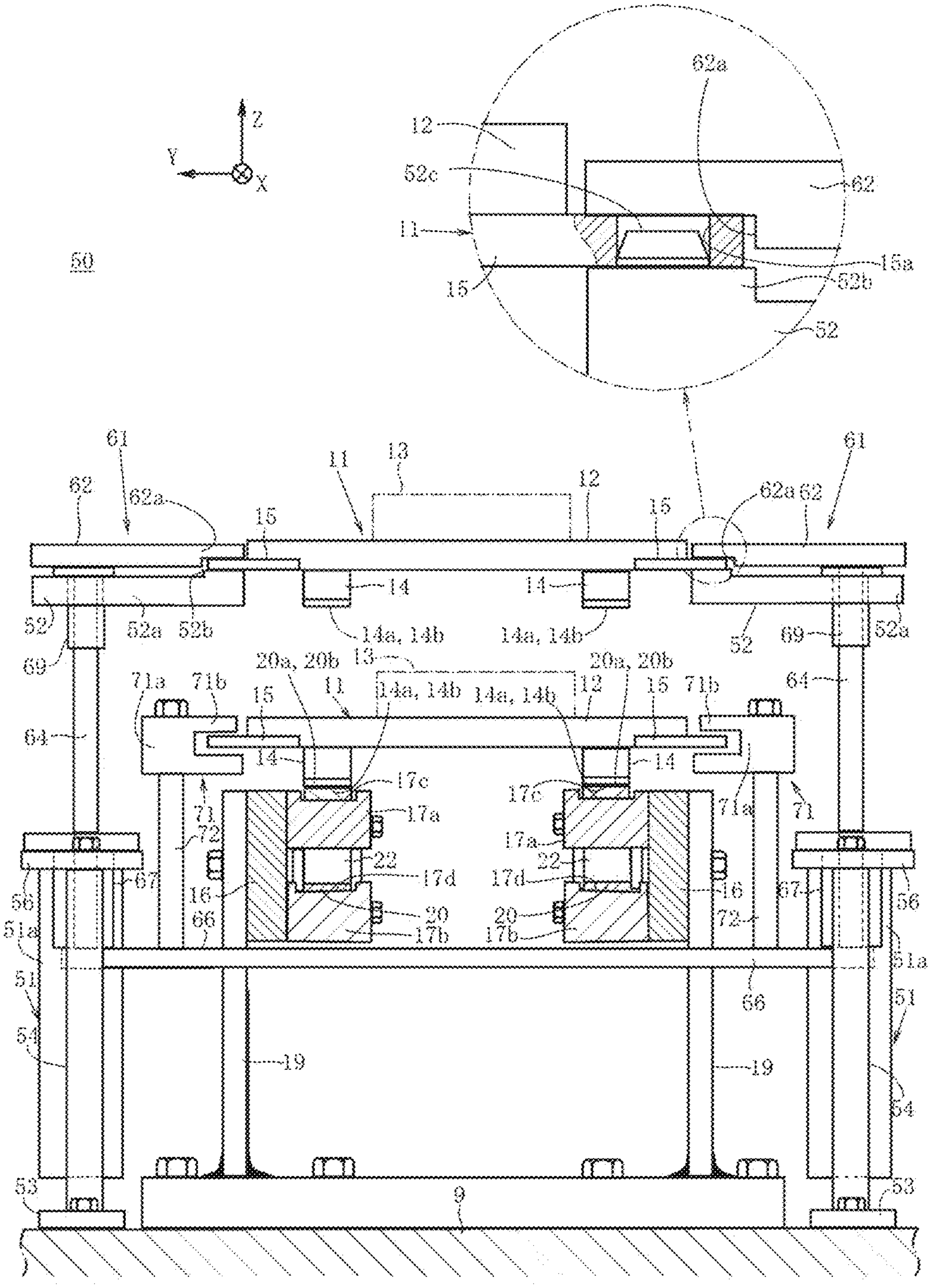
FIG. 8 is a diagram showing a state in which the lifted pallet is fixed by a fixing mechanism of the pallet lifting device, and is a diagram corresponding to FIG. 6.
Figure 9:
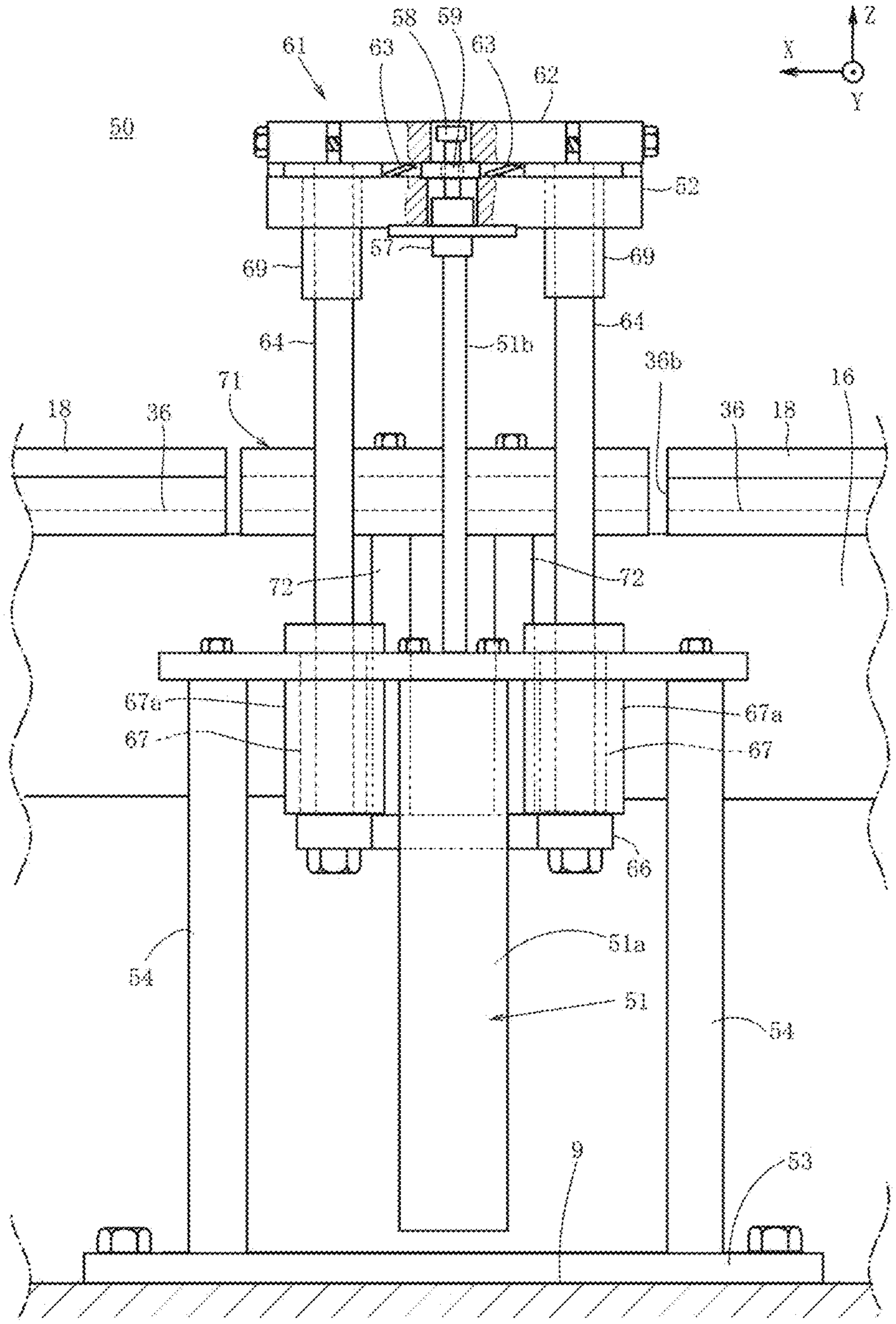
FIG. 9 is a diagram showing a state in which the lifted pallet is fixed by the fixing mechanism of the pallet lifting device, and is a diagram corresponding to FIG. 7.

However, because further upward movement of the mounting member 52 from this state is still allowed, as the rod 51*b* of the lifting and lowering actuator 51 is further projected upwards from the main body portion 51*a*, as shown in FIGS. 8 and 9, the gap between the pressing plate 62 and the mounting member 52 is narrowed against the biasing force applied by the springs 63. Eventually, the mounting portion 52*b* of the mounting member 52 clamps, together with the pressing plate 62, the flange member 15 of the pallet 11. Thus, the pallet 11 is fixed on the mounting member 52.

In addition, as shown in FIG. 4, the mounting members 52 are each provided with a pin 52*c* that projects towards the flange member 15 and tapers toward a tip end. In addition, the flange members 15 are provided with holes 15*a* into which the pins 52*c* can enter respectively.

In this embodiment, the pins 52*c* are formed at diagonal positions of the mounting members 52 (see FIG. 2), and each of the holes 15*a* is formed such that the inner diameter becomes slightly larger than the outer diameter of each of the pins 52*c*.

Therefore, when the gap between the pressing plate 62 and the mounting member 52 is narrowed against the biasing force applied by the springs 63 and the flange member 15 of the pallet 11 is clamped by the mounting portion 52*b* of the mounting member 52 and the pressing plate 62 (see FIG. 8), as shown in an enlarged view in FIG. 8, the pin 52*c* enters the hole 15*a* in the flange member 15 of the pallet 11. In this state, the pallet 11 is mounted at a correct position of the mounting member 52. Here, "the correct position" as used herein means a state in which there is no tilting in the X axis direction and the Y axis direction and there is no misalignment in the X axis direction and the Y axis direction with respect to the pallet 11.

Furthermore, the slide plates 66 is provided with auxiliary guide members 71 that respectively close the cutout portions 36*b* in the guide members 36 (enter the cutout portion 36*b*) when the mounting members 52 are lifted. The auxiliary guide members 71 are formed to have a shape that surrounds end portions of the flange members 15 of the pallet 11 in the Y axis direction from the sides, top, and bottom. The auxiliary guide members 71 have substantially the same cross-sectional shape as the cross-sectional shape of a portion formed by the guide members 36 and the retaining members 18.

In other words, the auxiliary guide members 71 each has a side wall portion 71*a* that opposes to an outer side surface the flange member 15 of the conveyed pallet 11 and an upper plate portion 71*b* that opposes to the upper surface of the flange member 15.

In addition, the auxiliary guide members 71 are respectively attached to the slide plates 66 via support columns 72. When the slide plates 66 abut to the collars 67*a*, the auxiliary guide members 71 that have been moved upward together with the slide plates 66 enter the cutout portions 36*b* of the guide members 36. In this state, the side surfaces of the flange members 15 of the pallet 11 passing through the auxiliary guide members 71 oppose to the side wall portions 71*a* so as to respectively form small gaps in the width direction, and the upper surfaces of the flange members 15 oppose to the upper plate portions 71*b* so as to respectively form small gaps in the vertical direction. With such a configuration, it is possible to prevent the misalignment of the pallet 11 in the width direction, the lifting off of the pallet 11 from the belts 20, and the tilting of the pallet 11 with respect to the belts 20 without inhibiting the movement of the pallet 11 in the conveying direction.

Next, a pallet conveying method using the pallet conveying device 10 will be described.

In the pallet conveying device 10, a plurality of pallets 11, on each of which the workpiece to be processed is mounted, are mounted on and successively conveyed by the circulating belts 20. The belts 20 are circulated by the driving mechanism 30. Specifically, the motor 31 is driven to rotate the pair of driving pulleys 23 at the same time, thereby allowing the pair of belts 20 respectively suspended between the driving pulleys 23 to be circulated in the same direction.

The pallets 11, on each of which the workpiece (not shown) is mounted, are conveyed by being mounted on the belts 20, and conveyed to the front of the machine tools 1 to 4 (see FIG. 2) that are provided along the conveying path of the belts 20. When the pallets 11 are respectively conveyed to the front of the machine tools 1 to 4, the circulation of the belts 20 is stopped temporarily to stop the pallets 11 mounted on the belts 20 at the positions assigned to the machine tools 1 to 4. As a result, it becomes possible to process the workpieces (not shown) mounted on the pallets 11 by the machine tools 1 to 4.

The workpiece (not shown) is mounted on the mounting tool 13 on the pallet 11. In addition, the pallet 11, on which the workpiece is mounted, is mounted on the belts 20 at the upstream-side end portion of the belts 20.

In addition, when the pallet 11 is mounted on the belts 20, the contact members 14 of the pallet 11 are brought to overlap with the belts 20. At this time, as shown in the enlarged view in FIG. 1, the grooves and teeth 14*a* and 14*b* respectively formed on the contact members 14 engage with the grooves and teeth 20*a* and 20*b* respectively formed on the belts 20, and thus, the movement of the pallet 11 in the X axis direction independent of the belts 20 is prohibited. In addition, because the retaining members 18 are provided, the pallets 11 mounted on the belts 20 are prevented from being lifted off from the belts 20. As a result, the engagement between the grooves and teeth 14*a* and 14*b* and the grooves and teeth 20*a* and 20*b* is prevented from being released.

With such a configuration, the pallet 11 is conveyed to the downstream side at a speed equal to the circulation speed of the belts 20. When the pallet 11 is conveyed to the front of the machine tool 1, which is provided to oppose to the belts 20, the circulation of the belts 20 is temporarily stopped to stop the conveyance of the pallet 11.

While the pallet 11 is being stopped to oppose to the machine tool 1, the machine tool 1 performs the processing on the workpiece (not shown) that is mounted on the pallet 11 whose movement is stopped.

In addition, for example, when the workpiece mounted on the pallet 11 is subjected to the processing, by mounting the pallet 11, on which another workpiece (not shown) is mounted, on the upstream-side end portion of the belts 20 so as to be spaced from the leading the pallet 11 with an interval equal to the interval between the machine tool 1 and the machine tool 2, it is possible to make the next pallet 11, on which the another workpiece is mounted, to stand by in the vicinity of a processing position.

When the processing of the workpiece mounted on the pallet 11 by the machine tool 1 is finished, the pallet 11, on which the workpiece is mounted, is conveyed towards the downstream. Specifically, by circulating the belts 20, the pallet 11 is moved to the downstream side together with the belts 20.

If the pallet 11 is waiting at a standby position on the upstream side of the processing position, the pallet 11 at the standby position is moved to the processing position. Thus, for example, when the leading pallet 11 is moved from the machine tool 1 and comes to oppose to the machine tool 2, the following pallet 11 comes to oppose to the machine tool 1. As a result, it becomes possible to start the processing of the workpieces mounted on the pallets 11 by the machine tools 1 and 2 immediately.

When the processing by the machine tools 1 and 2 are finished, the pallets 11 are further conveyed toward the downstream side together with these workpieces. Specifically, the belts 20 are circulated to move the pallets 11 further towards the downstream side. By repeating the conveyance and stopping of the pallets 11, the pallets 11 mounting the workpiece, which has been subjected to the required processing by the machine tools 1 to 4, are collected from the downstream-side end portion of the belts 20 together with the workpiece.

Furthermore, because the pallet conveying device 10 is provided with the pallet lifting device 50, it is possible to lift the pallet 11, which is mounted on and conveyed by the belts 20, while the pallet 11 is being conveyed and remove the pallet 11 from the belts 20.

In the pallet lifting device 50, the mounting members 52 are lowered in a normal pallet conveying state (see FIG. 4). In the normal pallet conveying state, when the pallet 11 is conveyed in a state in which it is mounted on the belts 20, the flange members 15 extending out towards the sides from the plates 16 respectively pass above the mounting portions 52*b* of the mounting members 52. In other words, in the normal pallet conveying state shown in FIG. 4, the movement of the pallets 11 mounted on the belts 20 passing through the pallet lifting device 50 is allowed.

As shown in FIG. 5, the guide members 36 are formed with the cutout portions 36*b* at the position where the pallet lifting device 50 is provided. In addition, as shown in FIG. 5, at the position where the pallet lifting device 50 is provided, there are no the retaining members 18. With such a configuration, for the lifting of the pallet 11, it is possible to lift the pallet 11, which is mounted on the mounting portions 52*b* of the mounting members 52, by causing the rods 51*b* of the lifting and lowering actuators 51 to project upward from the main body portions 51*a* in a state in which the pallet 11 opposes to the pallet lifting device 50 (see FIGS. 6 and 7).

As described above, by lifting the pallet 11, the lifted pallet 11 is removed from the belts 20. Next, by circulating the belts 20 in this state, other pallets 11 than the lifted pallet 11 are conveyed by a distance equal to the moved amount of the belts 20.

For example, after the other pallets 11 than the lifted pallet 11 are conveyed by a predetermined distance, the mounting members 52 are lowered by the lifting and lowering actuators 51, and the lifted pallet 11 is lowered together with the mounting members 52 and caused to be mounted on the belts 20 again, and thereby, it is possible to increase the distance from the leading pallet 11 and/or to reduce the distance to the following pallet 11.

In addition, as shown in FIGS. 6 and 7, if a lifted height of the pallet 11 by the pallet lifting device 50 is greater than the height of the workpiece on the following pallet 11, by circulating the belts 20 in a state in which the pallet 11 is lifted by the pallet lifting device 50, it is possible to allow another following pallet 11 to pass under the lifted pallet 11. As a result, it is also possible to change a conveyance order of the pallet 11.

In addition, for example, by allowing the following pallet 11 to pass under the pallet 11 that is lifted by the pallet lifting device 50 and by causing the following pallet 11 to oppose to the machine tool 4 provided on the downstream side of the pallet lifting device 50 (see FIG. 2), it is also possible to perform the processing by the machine tool 4 on the workpiece mounted on the following pallet 11.

In the pallet lifting device 50 in this embodiment, the slide plates 66 are provided with the auxiliary guide members 71 that respectively close the cutout portions 36*b* when the mounting members 52 are moved upward. With such a configuration, when the following pallet 11 passes under the lifted pallet 11, the following pallet 11 can pass through the cutout portions 36*b* though the auxiliary guide members 71.

When the following pallet 11 passes under the lifted pallet 11, the flange members 15 of the pallet 11 passing through the auxiliary guide members 71 respectively oppose to the side wall portions 71*a* and the upper plate portions 71*b* of the auxiliary guide members 71 in the width directions and the upward direction by forming a gap therebetween. With such a configuration, it is possible to prevent the misalignment of the pallet 11 in the width direction, the lifting off of the pallet 11 from the belts 20, and the tilting of the pallet 11 with respect to the belts 20 without inhibiting the movement of the following pallet 11 in the conveying direction. Therefore, the following pallet 11 passing under the lifted pallet 11 can pass under the lifted pallet 11 without delay in a state in which the following pallet 11 is mounted on the circulating belts 20.

In addition, by causing the pallet 11 in a state in which it is lifted by the pallet lifting device 50 to oppose to the machine tool 3 (see FIG. 2), it is possible to perform the processing by the machine tool 3 on the workpiece mounted on the pallet 11 in a state in which it has been lifted.

The pallet lifting device 50 is provided with the fixing mechanisms 61 that fix the pallet 11 to the mounting members 52 by clamping the pallet 11 with the mounting members 52 in a state in which the mounting members 52, on which the pallet 11 is mounted, are moved upward by the lifting and lowering actuators 51. As a result, it is possible to prevent the workpiece mounted on the pallet 11 from being misaligned during the processing and to avoid interference with the processing of the workpiece.

Especially, because the pressing plates 62 are respectively formed with step portions 62*a* that come into contact with the side surfaces of the flange members 15 of the pallet 11 to limit the movement of the pallet 11 in the width direction, even if a slight misalignment is caused when the pallet 11 is mounted on the mounting members 52 in the lowered state, the misalignment can be corrected by the step portions 62*a* during the upward movement of the mounting members 52. As the pallet 11 is lifted further, the pallet 11, in a state in which the misalignment has been corrected, is fixed to the mounting members 52 by the fixing mechanisms 61. Thus, the workpiece mounted on the pallet 11 at the lifted position can be processed in a state in which there is no misalignment.

In other words, even if a slight misalignment has been caused for the pallet 11 in a state in which the pallet 11 is mounted on the mounting members 52 at the lowered position, the misalignment can be corrected before the lifted state is achieved, and so, it become also possible to perform the processing requiring precise alignment.

In addition, in the pallet lifting device 50, as shown in FIG. 4, the mounting members 52 are provided with the pins 52*c* each having a tapered shape toward the tip end so as to project towards the flange members 15. Furthermore, the flange members 15 are formed with the holes 15*a* into which the pins 52*c* can enter. As shown in FIG. 8, when the flange members 15 of the pallet 11 are clamped by the mounting portion 52*b* of the mounting member 52 and the pressing plates 62, as shown in the enlarged view in FIG. 8, the pins 52*c* respectively enter the holes 15*a* in the flange members 15 of the pallet 11.

As a result, even if a slight misalignment is caused in a state in which the pallet 11 is mounted on the mounting members 52, by causing the tapered pins 52*c* to respectively enter the holes 15*a* while the pallet 11 is fixed to the mounting members 52 by the fixing mechanisms 61, it is possible to cause the pallet 11 to return to the correct position on the mounting members 52. Furthermore, as described above, by causing the pins 52*c* to enter the holes 15*a*, it is possible to reliably prevent the misalignment of the pallet 11 during the processing by the machine tool 3.

In addition, in the above-mentioned embodiment, because the pair of pins 52*c* are formed at the diagonal positions on each of the mounting members 52 (see FIG. 2), it is possible to make the distance between the pins 52*c* provided on both sides of the pallet 11 in the width direction (in the Y axis direction) greater compared with a case in which the pins 52*c* are formed at symmetrical positions (for example, a case in which the pins 52*c* are formed at the same X-axis position but spaced apart in the Y axis direction). With such a configuration, an amount of misalignment of the pallet 11 with respect to the mounting members 52 can be reduced, and the pallet 11 can be mounted at the correct position more accurately.

In the above-mentioned embodiment, although a description has been given of a case in which the contact members 14 are provided on both sides of lower part of the base mount 12 and the contact members 14 are overlapped with the belts 20, as an example, the base mount 12 may be mounted on the belts 20 directly without providing the contact members 14 as long as the pallet 11 mounted on the belts 20 can be conveyed.

In addition, in the above-mentioned embodiment, as an example, a description has been given of a case in which a so-called toothed belt is used as the belts 20 in which the grooves and teeth 20*a* and 20*b* extending in the width direction are formed on the outer surface of the belts 20, which serves as the mounting surface for the pallet 11, with the grooves and teeth 20*a* and 20*b* being formed alternately and sequentially in the longitudinal direction, as shown in the enlarged view in FIG. 1. However, the belts 20 may be a belt without the grooves and teeth 20*a* and 20*b* as long as the pallet 11 mounted on the belts 20 can be conveyed accurately.

In addition, in the above-mentioned embodiment, although a case in which the pair of pins 52*c* are formed on each of the mounting members 52, the pins 52*c* may be provided at any positions as long as the misalignment of the pallet 11 can be corrected. Specifically, the pins 52*c* may be formed on the pressing plate 62.

In addition, in the above-mentioned embodiment, a description has been given of the pallet conveying device 10 in which four machine tools 1 to 4 are linked. However, although not illustrated, five or more machine tools may be linked in the pallet conveying device 10. Even if the number of processing steps is increased due to the increase in the number of machine tools, by providing the pallet lifting device 50 for lifting the pallet 11, which is mounted on and conveyed by the moving belts 20, while the pallet 11 is being conveyed, it is possible to change the distances (pitch) between the pallets 11, on which the workpiece is mounted, to reduce the number of the pallets 11 required.

Furthermore, in the above-mentioned embodiment, a description has been given of a case in which the pallet conveying device 10 is provided with a single pallet lifting device 50. However, the pallet conveying device 10 may be provided with two or more pallet lifting devices 50. By providing two or more pallet lifting devices 50, even if the number of processing steps is increased due to the increase in the number of machine tools, the number of places where the distances (pitch) between the pallets 11 or the order of the pallets 11 can be changed is increased, thereby allowing various conveying modes of the pallet 11.

The configurations, operations, and effects of the embodiments of the present invention will be collectively described below.

The pallet lifting device 50 lifts the pallet 11 mounted on and conveyed by the moving belt 20 while the pallet 11 is being conveyed. The pallet lifting device 50 is provided with: the lifting and lowering actuators 51 provided on both sides of the belt 20 such that the belt 20 are provided between the lifting and lowering actuators 51; the mounting member 52 provided so as to be movable up and down by the lifting and lowering actuators 51, the mounting member 52 being configured so as to be able to mount, at the lowered position, the pallet 11 mounted on and conveyed by the belt 20; and the fixing mechanism 61 configured to fix the pallet 11 to the mounting member 52 by clamping the pallet 11 with the mounting member 52 in a state in which the mounting member 52 mounting the pallet 11 is moved upward by the lifting and lowering actuators 51.

With this configuration, because the fixing mechanism 61 fixes the pallet 11 to the mounting member 52 in a state in which the mounting member 52 mounting the pallet 11 is moved upward, even if a slight misalignment is caused in a state in which the pallet 11 is mounted on the mounting member 52 in the lowered state, by correcting the misalignment in a process in which the mounting member 52 is moved upward, it is possible to correct the misalignment of the pallet 11 at the stage when the pallet 11 has been lifted.

In addition, in the pallet lifting device 50, the fixing mechanism 61 is provided with: the up and down rod 64 provided on the mounting member 52 so as to be movable up and down; the pressing plate 62 attached to the upper end of the up and down rod 64, the pressing plate 62 being provided above the mounting member 52 so as to be spaced at a predetermined interval from the mounting member 52; the spring 63 (the biasing member) configured to bias such that the interval between the pressing plate 62 and the mounting member 52 is increased; the slide plate 66 attached to the lower end of the up and down rod 64; and the collar 67*a* (the limiting member) configured to prohibit the upward movement of the up and down rod 64 by abutting to the slide plate 66 when the mounting member 52 is moved upward to a predetermined position by the lifting and lowering actuators 51.

With this configuration, the pallet 11 is fixed to the mounting member 52 when the mounting member 52 mounting the pallet 11 is moved upward to a predetermined position by the lifting and lowering actuators 51. Therefore, it is possible to adjust the misalignment of the pallet 11 while the mounting member 52 mounting the pallet 11 is being moved upward to a predetermined position. Therefore, it is possible to ensure a sufficient time for adjusting the misalignment until the pallet 11 is fixed to the mounting member 52.

In the pallet lifting device 50, the pressing plate 62 is formed with the step portion 62*a* opposing to the side surface of the pallet 11, the step portion 62*a* being configured to limit the movement of the pallet 11 in the width direction.

With this configuration, even if a slight misalignment is caused when the pallet 11 is mounted on the mounting member 52 in the lowered state, it is possible to correct the misalignment by the step portion 62*a* while the mounting member 52 is being moved upward.

The pallet lifting device 50 is further provided with the pins 52*c* formed at the diagonal positions on the mounting member 52 or the pressing plate 62; and the holes 15*a* formed in the pallet 11 such that the pins 52*c* can enter the holes 15*a* respectively.

With this configuration, by causing the pins 52*c* to enter the holes 15*a* while the fixing mechanism 61 is fixing the pallet 11 to the mounting member 52, it is possible to cause the pallet 11 to return to the correct position on the mounting member 52. Furthermore, by causing the pins 52*c* to enter the holes 15*a*, it is possible to reliably prevent the misalignment of the pallet 11 during the processing by the machine tool 3.

The pallet conveying device 10 is provided with the pallet lifting device 50. In the pallet conveying device 10: the belt 20 is attached to the pair of plates 16 so as to be capable of being circulated, the pair of plates 16 being provided such that a predetermined interval is formed in the width direction; the flange members 15 are formed on both sides of the pallet 11, and in a state in which the pallet 11 is mounted on the belt 20, the flange members 15 respectively projecting outwards to the outer sides of the plates 16 by passing over the pair of plates 16; and the pallet lifting device 50 is attached such that the flange members 15 on both sides of the pallet 11, which is mounted on and conveyed by the belts 20, can be mounted on the mounting member 52 in the lowered state.

With this configuration, after the other pallet 11 than the lifted pallet 11 is conveyed by a predetermined distance, the lifted pallet 11 is lowered cand caused to be mounted on the belt 20 again, and thereby, it is possible to increase the distance from the leading pallet 11 and to reduce the distance to the following pallet 11.

In addition, the pallet conveying device 10 is further provided with the guide member 36 attached to the upper portion of the plates 16, the guide member 36 being configured to limit the movement of the pallet 11, which is mounted on and conveyed by the belt 20, in the width direction, wherein the guide member 36 is formed with the cutout portion 36*b* capable of receiving the mounting member 52 in the lowered state. The pallet lifting device 50 is provided with the auxiliary guide member 71 configured to close the cutout portion 36*b* in a state in which the mounting member 52 is moved upward.

With this configuration, in a state in which the pallet 11 is lifted by the pallet lifting device 50, another following pallet 11 can pass under the lifted pallet 11, and thereby, it is possible to change the conveyance order of the pallet 11.

The pallet conveying device 10 is further provided with: the first engagement part provided on the belt 20, the first engagement part being formed of the grooves and teeth 20*a* and 20*b* provided alternately and sequentially in the longitudinal direction; the second engagement part provided on the pallet 11, the second engagement part being formed of the grooves and teeth 14*a* and 14*b* capable of engaging with the first engagement part; and the retaining member 18 provided on the guide member 36, the retaining member 18 being configured to prevent the pallet 11 mounted on the belt 20 from lifting off from the belt 20 or tilting with respect to the belt 20.

With this configuration, because the retaining member 18 is provided, the pallet 11 mounted on the belt 20 is prevented from lifting off from the belt 20 or tilting with respect to the belt 20. As a result, it is possible to maintain a state in which the grooves and teeth 14*a* and 14*b* formed on the contact member 14 of the pallet 11 are engaged with the grooves and teeth 20*a* and 20*b* formed on the belt 20, and so, it is possible to prohibit the relative movement between the belt 20 and the pallet 11. In other words, it is possible to covey the pallet 11 by the belt 20 reliably.

Embodiments of this invention were described above, but the above embodiments are merely examples of applications of this invention, and the technical scope of this invention is not limited to the specific constitutions of the above embodiments.

This application claims priority based on Japanese Patent Application No. 2022-181586 filed with the Japan Patent Office on Nov. 14, 2022, the entire contents of which are incorporated into this specification.

The invention claimed is:

1. A pallet conveying device including a pallet lifting device configured to lift a pallet mounted on and conveyed by a moving belt while the pallet is being conveyed, wherein the pallet lifting device has:

lifting and lowering actuators provided on both sides of the belt such that the belt is provided between the lifting and lowering actuators;

a mounting member provided so as to be movable up and down by the lifting and lowering actuators, the mounting member being configured so as to be able to mount, at a lowered position, the pallet mounted on and conveyed by the belt; and a fixing unit configured to fix the pallet to the mounting member by clamping the pallet with the mounting member in a state in which the mounting member mounting the pallet is moved upward by the lifting and lowering actuators, and wherein the belt is attached to a pair of plates so as to be capable of being circulated, the pair of plates being provided such that a predetermined interval is formed in a width direction, flange members are formed on both sides of the pallet, and in a state in which the pallet is mounted on the belt, the flange members respectively projecting outwards to outer sides of the plates by passing over the pair of plates, and the pallet lifting device is attached such that the flange members on both sides of the pallet, which is mounted on and conveyed by the belt, can be mounted on the mounting member in a lowered state of the pallet lifting device.

2. The pallet conveying device according to claim 1, further comprising a guide member attached to an upper portion of the plates, the guide member being configured to limit movement of the pallet, which is mounted on and conveyed by the belt, in a width direction, wherein the guide member is formed with a cutout portion capable of receiving the mounting member in the lowered state, and the pallet lifting device is provided with an auxiliary guide member configured to close the cutout portion in a state in which the mounting member is moved upward.

3. The pallet conveying device according to claim 2, further comprising:

a first engagement part provided on the belt, the first engagement part being formed of grooves and teeth provided alternately and sequentially in a longitudinal direction;

a second engagement part provided on the pallet, the second engagement part being formed of grooves and teeth capable of engaging with the first engagement part; and a retaining member provided on the guide member, the retaining member being configured to prevent the pallet mounted on the belt from lifting off from the belt or tilting with respect to the belt.

4. A pallet conveying method using a pallet lifting device configured to lift a pallet mounted on and conveyed by a moving belt while the pallet is being conveyed, wherein the pallet lifting device has:

lifting and lowering actuators provided on both sides of the belt such that the belt is provided between the lifting and lowering actuators;

a mounting member provided so as to be movable up and down by the lifting and lowering actuators, the mounting member being configured so as to be able to mount, at a lowered position, the pallet mounted on and conveyed by the belt; and a fixing unit configured to fix the pallet to the mounting member by clamping the pallet with the mounting member in a state in which the mounting member mounting the pallet is moved upward by the lifting and lowering actuators, and wherein the belt is attached to a pair of plates so as to be capable of being circulated, the pair of plates being provided such that a predetermined interval is formed in a width direction, flange members are formed on both sides of the pallet, and in a state in which the pallet is mounted on the belt, the flange members respectively projecting outwards to outer sides of the plates by passing over the pair of plates, and the pallet lifting device is attached such that the flange members on both sides of the pallet, which is mounted on and conveyed by the belt, can be mounted on the mounting member in a lowered state of the pallet lifting device.

5. The pallet conveying method according to claim 4, wherein a guide member is attached to an upper portion of the plates, the guide member being configured to limit movement of the pallet, which is mounted on and conveyed by the belt, in a width direction, the guide member is formed with a cutout portion capable of receiving the mounting member in the lowered state, and the pallet lifting device is provided with an auxiliary guide member configured to close the cutout portion in a state in which the mounting member is moved upward.

6. The pallet conveying method according to claim 5, wherein a first engagement part is provided on the belt, the first engagement part being formed of grooves and teeth provided alternately and sequentially in a longitudinal direction, a second engagement part is provided on the pallet, the second engagement part being formed of grooves and teeth capable of engaging with the first engagement part, and a retaining member is provided on the guide member, the retaining member being configured to prevent the pallet mounted on the belt from lifting off from the belt or tilting with respect to the belt.

7. The pallet conveying method according to claim 4, wherein the pallet is fixed to the mounting member by clamping the pallet with the mounting member in a state in which the mounting member mounting the pallet is moved upward by the lifting and lowering actuators.

* * * * *